United States Patent [19]

Covington

[11] 3,760,280

[45] Sept. 18, 1973

[54] METHOD AND APPARATUS FOR DELAYING AN ELECTRICAL SIGNAL

[75] Inventor: Morris T. Covington, Houston, Tex.

[73] Assignee: Taft Broadcasting Corporation, Houston, Tex.

[22] Filed: June 7, 1972

[21] Appl. No.: 260,585

[52] U.S. Cl. .................... 328/55, 328/56, 307/208, 307/293, 331/173

[51] Int. Cl. .................... H03k 5/159, H03k 5/00

[58] Field of Search .................... 328/55, 56, 155; 307/293, 208, 233, 269; 331/173

[56] References Cited

UNITED STATES PATENTS

| | | | |
|---|---|---|---|
| 3,105,939 | 10/1963 | Onno et al. | 328/55 X |
| 3,206,686 | 9/1965 | Goor | 328/55 X |
| 3,562,670 | 2/1971 | Uchida | 331/173 |
| 3,582,797 | 6/1971 | Riethmeier | 328/155 |

*Primary Examiner*—John W. Huckert
*Assistant Examiner*—Andrew J. James
*Attorney*—J. Vincent Martin et al.

[57] ABSTRACT

A system for actively delaying an electrial signal. The electrical signal to be delayed is converted into a frequency modulated signal. This FM signal is coupled to a digital memory device operating responsive to a control signal. The rate of the control signal and the physical capacity of the memory device determine the delay of the FM signal. The delayed FM signal is demodulated back into its original format. This abstract is neither intended to define the invention of the application which, of course, is measured by the claims, nor is it intended to be limiting as to the scope of the invention in any way.

7 Claims, 1 Drawing Figure

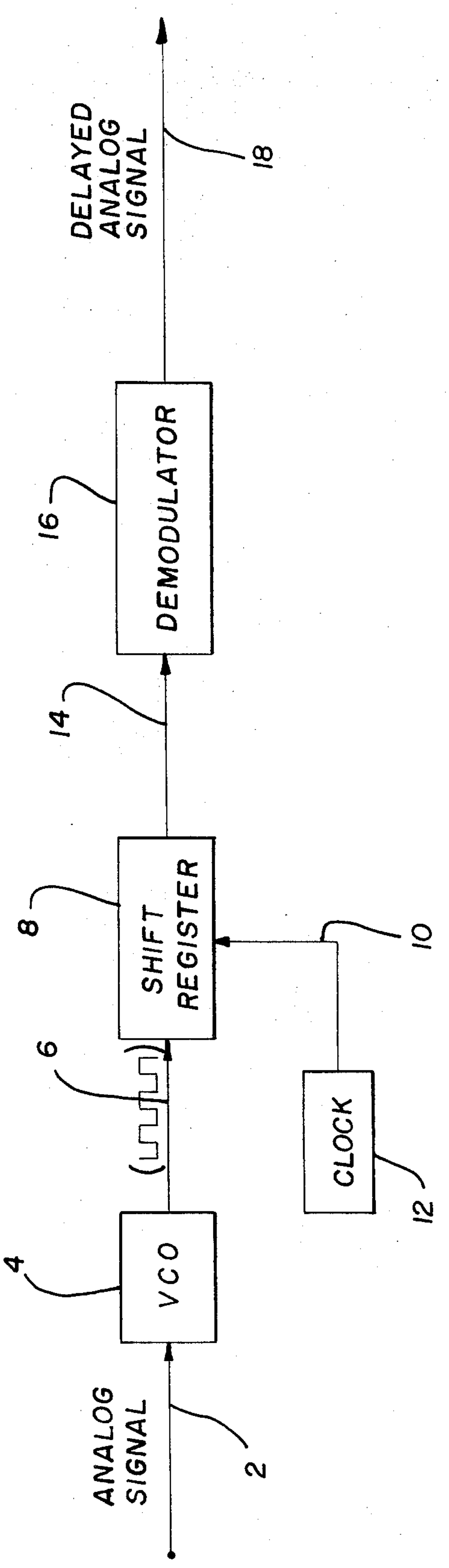
ANALOG SIGNAL
2
VCO
4
6
SHIFT REGISTER
8
CLOCK
12
10
14
DEMODULATOR
16
DELAYED ANALOG SIGNAL
18

METHOD AND APPARATUS FOR DELAYING AN ELECTRICAL SIGNAL

BACKGROUND OF THE INVENTION

This invention relates to a method of and apparatus for actively delaying an electrical signal for variable, preselected periods of time.

There are numerous devices known in the art for delaying electrical signals for short periods of time such as 1 or 2 nanoseconds. These devices are sometimes referred to as passive delaying devices. They normally include capacitors, lengths of electrical conductor and other standard basic electrical components. Constructing a passive delay device capable of delaying an electrical signal for even several hundred microseconds runs into high cost, weight and space requirements which makes the delay device impractical for many applications.

There has long been a need in the art for a method and apparatus for delaying electrical signals for relatively long periods of time, such as several milliseconds. In U.S. Pat. No. 3,277,381, Sullivan discloses delaying an electrical signal for a time period greater than that allowed by a passive delay unit by multiplying the delay of a passive delay unit. In U.S. Pat. No. 2,800,580, Davies discloses an apparatus for actively delaying an electrical signal for a preselected interval of time by recirculating the signal repeatedly through a standard passive delaying means. Another technique known in the art is to transform an analog electrical signal into a standard binary signal comprised of a plurality of electrical conductors each of which carries the presence or absence of an electrical signal. These binary signals are stored in some memory device, such as a shift register, for a preselected interval of time. Upon expiration of the preselected interval of time, this binary signal is recalled and converted back to analog form. Such a technique is incorporated in the Signal Processing System disclosed in U.S. Pat. No. 3,489,996 to Moon et al. The U.S. Pat. No. 2,824,227 to Richman discloses an active delay system wherein the time delay of the electrical signal is varied in accordance with a second electrical control signal. The electrical signal to be delayed is encoded as modulation of carrier signal and the modulated carrier signal is then supplied to a frequency-sensitive delay network which imparts thereto a time delay dependent on the carrier frequency. Each of the apparatus disclosed in U.S. Pat. Nos. 2,800,580; 2,824,227 and 3,277,381 involves complicated circuitry and, for one reason or another, has not proven satisfactory or has contained some disadvantage. The active delay device illustrated in U.S. Pat. No. 3,489,996, while simple in operation, is expensive to construct because analog-to-digital converters and digital-to-analog converters presently are relatively expensive.

It is an object of this invention, therefore, to provide a new and improved active delay system for an electrical signal which substantially avoids one or more of the foregoing limitations of the active delay systems heretofore known to the art.

It is an object of this invention to provide a new and improved active delay system wherein an electrical signal may be delayed for varying periods of time.

It is another object of this invention to provide a new and improved active delay system which is simple, yet extremely accurate, and which is relatively inexpensive and compact.

The improved active delay system according to this invention comprises circuitry for converting an analog electrical signal to be delayed to a frequency-modulated electrical signal. This frequency-modulated signal is coupled to the input of a digital delay line or memory device operating responsive to a preselected control signal. The rate of the control signal and the storage capacity of the memory device determine the length of delay of the FM signal. The delayed frequency-modulated output of the digital delay line or memory device is then demodulated back into analog format.

These and other objects and advantages are hereinafter set forth and explained.

BRIEF DESCRIPTION OF THE DRAWING

The drawing illustrates in block diagram a preferred embodiment of this invention.

DESCRIPTION OF THE INVENTION

In the preferred embodiment of this invention, the electrical signal to be delayed is originally in analog format. It is coupled over line 2 to the input of a means 4 for converting a preselected parameter thereof, such as voltage or current, to a frequency modulated electrical signal. The term frequency modulated electrical signal refers to a binary signal whose amplitude changes rapidly between two levels, one greater than and the other lesser than a preselected threshold value. The rate of occurrence of the transition between the two levels is the frequency of the signal. The frequency modulation means 4 is preferably a voltage controlled oscillator (VCO) which converts the signal to a square wave FM signal with frequency rate responsive to the one of the preselected parameters of the electrical signal applied to its input. The VCO is a standard device well known to those skilled in the art, such as a Motorola MC4024. The output of the frequency modulation means 4 is transmitted over line 6 to the input of a digital memory means 8 for storing preselected portions of the frequency modulated signal until such time as a control pulse is sensed at its input over line 10. The digital memory means 8 is a digital delay line or memory device such as is well known to those skilled in the art. It is preferably a shift register, such as a National Semiconductor MM 5053–H. The control signal applied over line 10 to the input of shift register 8 preferably is provided by a clock 12, a standard device well known to those skilled in the art, such as a Motorola MC4024. The control signal generated by a clock 12 comprises a pulse train generated at a preselected rate.

Shift register 8 stores one or more of the cycles comprising the frequency modulated signal supplied to its input and, as is well known in the art, shifts the individual cycles through the register in distinct steps. Since the register performs a shift operation each time a pulse is generated by clock 12, the rate of occurrence of the pulses comprising the control signal will be one of the variables which determines how long it will take to shift a particular cycle of the frequency modulated signal through shift register 8. Stated otherwise, the rate of the control signal is one of the variables which determines the period of time the frequency modulated signal will be delayed. The other variable which determines the period of time the frequency modulated signal will be delayed is the number of cycles of the FM signal which may be stored simultaneously in the shift register.

For example, assuming that a control signal having 500 pulses per second is driving a shift register capable of storing and shifting 100 cycles at a time, one-fifth of a second will be required for a cycle of the FM signal to shift completely through the register. In other words, the frequency modulated signal will be delayed one-fifth of a second by the shift register.

In order that the frequency modulated signal is not distorted by the shift register 8, the rate of occurrence or frequency of the pulses comprising the clock signal must not be less than twice the highest frequency of the frequency modulated signal. In the preferred embodiment of this invention, the frequency of the clock signal is not less than 10 times the highest frequency of the FM signal.

The delayed frequency modulated signal output from shift register 8 is coupled over line 14 to the input of a demodulator 16. Demodulator 16 is a standard device well known to those skilled in the art, such as a National Semiconductor LM565CM, which functions to convert the delayed frequency modulated signal received at its input into an analog electrical signal having the preselected one of its parameters responsive to the frequency of the delayed frequency modulated signal. The delayed analog signal is output over line 18 from this preferred embodiment of the improved active delay system.

It will now be apparent to those skilled in the art that the foregoing disclosure and description of the invention are illustrative and explanatory thereof, and various changes in the materials as well as in the details of the illustrated construction may be made within the scope of the appended claims without departing from the spirit of the invention.

What is claimed is:

1. A method for delaying an analog electrical signal including the steps of:

converting said analog electrical signal into a frequency modulated electrical signal having frequency responsive to a preselected parameter of said analog electrical signal;

supplying a control signal comprised of a train of pulses occurring at a preselected rate, the rate of occurrence of said pulses comprising said control signal being at least twice the highest frequency of said frequency modulated electrical signal;

receiving each cycle at the input of a storage means having a preselected number of discrete storage units;

shifting each cycle from storage unit to storage unit through said storage means, the shifting operations occurring responsive to the pulses comprising said control signal;

emitting each cycle once it has shifted completely through said digital storage means; and converting said delayed frequency modulated signal into an analog electrical signal having said preselected one of its parameters responsive to the frequency of said delayed frequency modulated electrical signal.

2. A method for delaying an analog electrical signal according to claim 1 wherein said rate of occurrence of said control signal is at least 10 times the highest frequency of said frequency modulated electrical signal.

3. An apparatus for delaying an analog electrical signal, comprising:

circuit means for converting said analog electrical signal into a frequency modulated electrical signal having frequency responsive to a preselected parameter of said analog electrical signal;

circuit means for supplying a control signal comprised of a train of pulses occurring at a preselected rate, said rate of occurrence of said control signal being at least twice the highest frequency of said frequency modulated electrical signal, circuit means coupled to the outputs of said converting circuit means and said control signal circuit means for delaying each cycle of said frequency modulated electrical signal for a preselected time period determined in part by said control signal; and circuit means coupled to the output of said storage means for converting the delayed frequency modulated electrical signal emitted by said storage means into an analog electrical signal having said preselected one of its parameters responsive to the frequency of said delayed frequency modulated signal.

4. An apparatus for delaying an analog electrical signal according to claim 4 wherein said delaying circuitry comprises a storage means having a preselected number of discrete storage units, each of said cycles being shifted from storage unit to storage unit through said circuitry reqponsive to the pulses comprising said control signal.

5. An apparatus for delaying an analog electrical signal according to claim 4 wherein said rate of occurrence of the pulses comprising said control signal is at least 10 times the highest frequency of said frequency modulated electrical signal.

6. An apparatus for delaying an analog electrical signal, comprising:

a voltage controlled oscillator for converting said analog electrical signal into a frequency modulated signal having frequency responsive to a preselected one of the parameters of said analog electrical signal;

a clock for generating a signal comprised of a plurality of discrete pulses occurring at a preselected rate, said rate of occurrence being at least twice the highest frequency of said frequency modulated signal;

a shift register coupled to the outputs of said voltage controlled oscillator and said clock for storing and shifting the individual cycles of said freqeuncy modulated signal, the shifting operations of said shift register occurring responsive to the pulses comprising said clock signal, each cycle of said frequency modulated signal being emitted by said shift register after it has shifted completely therethrough; and a demodulator coupled to the output of said shift register for converting said delayed frequency modulated signal into an analog electrical signal having said preselected one of its parameters responsive to the frequency of the delayed frequency modulated electrical signal.

7. An apparatus for delaying an analog electrical signal according to claim 6 wherein said rate of occurrence of the pulses emitted by the clock is at least 10 times the highest frequency of said frequency modulated electrical signal.

* * * * *